United States Patent [19]

Losert

[11] 4,354,384
[45] Oct. 19, 1982

[54] VISUAL DEVICE FOR ICE CUBE TRAYS

[75] Inventor: Gerhard K. Losert, Louisville, Ky.

[73] Assignee: General Electric Company, Louisville, Ky.

[21] Appl. No.: 182,884

[22] Filed: Sep. 2, 1980

[51] Int. Cl.³ .......................... F25B 49/00; G01K 3/00
[52] U.S. Cl. ...................................... 374/134; 62/125; 374/141
[58] Field of Search .................. 73/343 B, 376, 362.8, 73/374, 371, 378

[56] References Cited

U.S. PATENT DOCUMENTS

| | | | |
|---|---|---|---|
| 1,886,042 | 11/1932 | Osborne | 73/362.8 X |
| 2,181,582 | 11/1939 | Gerber | 62/108.5 |
| 2,302,640 | 11/1942 | Schmidt | 73/374 |
| 2,336,238 | 12/1943 | Fordyce et al. | 73/151 |
| 2,471,229 | 5/1949 | McDonald | 73/376 |
| 2,737,050 | 3/1966 | Moninger | 73/343 R |
| 3,163,025 | 12/1964 | Dahlgren | 62/177 |
| 3,226,939 | 1/1966 | Harbison et al. | 62/177 |
| 3,273,353 | 9/1966 | Horvey et al. | 62/353 |
| 3,546,942 | 12/1970 | Thiele | 73/374 |
| 4,173,894 | 11/1979 | Gerike | 73/362.8 |

Primary Examiner—Daniel M. Yasich
Attorney, Agent, or Firm—Frederick P. Weidner; Radford M. Reams

[57] ABSTRACT

A visual device for use in a freezer compartment of a refrigerator to indicate when water in an ice cube tray is frozen. The device includes a stationary thermal insulated base in close proximity to a portion of the ice cube tray. There is a thermometer embedded in the insulated base and having a bulb with liquid and a connecting capillary tube for a liquid column. A thermal conductive member is in thermal transfer relationship between a portion of the ice cube tray and the thermometer bulb. Visual means relative to the liquid column in the capillary tube are provided to indicate when water in the tray is frozen.

7 Claims, 4 Drawing Figures

VISUAL DEVICE FOR ICE CUBE TRAYS

BACKGROUND OF THE INVENTION

This invention relates to a visual device for use in a household refrigerator and is more particularly concerned with use in a combination refrigerator, that is, a refrigerator including a freezer compartment on top and a fresh food compartment below, commonly referred to as a top mount refrigerator.

Top mount refrigerators present a problem for the user in determining whether water in an ice cube tray is frozen and ready for harvesting the ice cubes from the tray. It is common in top mount refrigerators to place the ice cube tray on a rack in close proximity to the top of the freezer compartment out of the way of other items stored in the freezer compartment. In this position, the user of the refrigerator finds it very difficult to be able to see or even feel into the ice cube tray to determine if the ice pieces are ready to be harvested from the tray. It is therefore desirable to be able to provide a visual device that displays to the user the fact that the water is frozen and the ice cubes may be removed from the ice cube tray. It is also desirable that such a visual device may be used in conjunction with either an ice cube tray where it is automatically filled with water with a manual harvest or with an ice cube tray that is manually filled with water and harvested manually.

By my invention, I provide a visual device having the above desirable characteristics that is low in cost and effective as a visual indicator to quickly display to the user the fact that the water is frozen and the ice cubes may be harvested from the ice cube tray.

SUMMARY OF THE INVENTION

There is provided in the freezer compartment of a refrigerator a visual device to indicate when water in an ice cube tray is frozen and includes a stationary thermal insulated base in close proximity to a portion of the ice cube tray. There is a thermometer having a bulb with liquid and a connecting capillary tube for a liquid column, said thermometer being embedded in the insulated base. There is a thermal conductive member in heat transfer relationship between a portion of the ice cube tray and the thermometer bulb. There are visual means relative to the liquid column in the capillary tube to indicate when water in the ice cube tray is frozen.

DESCRIPTION OF THE PREFERRED EMBODIMENT

Figure 1:
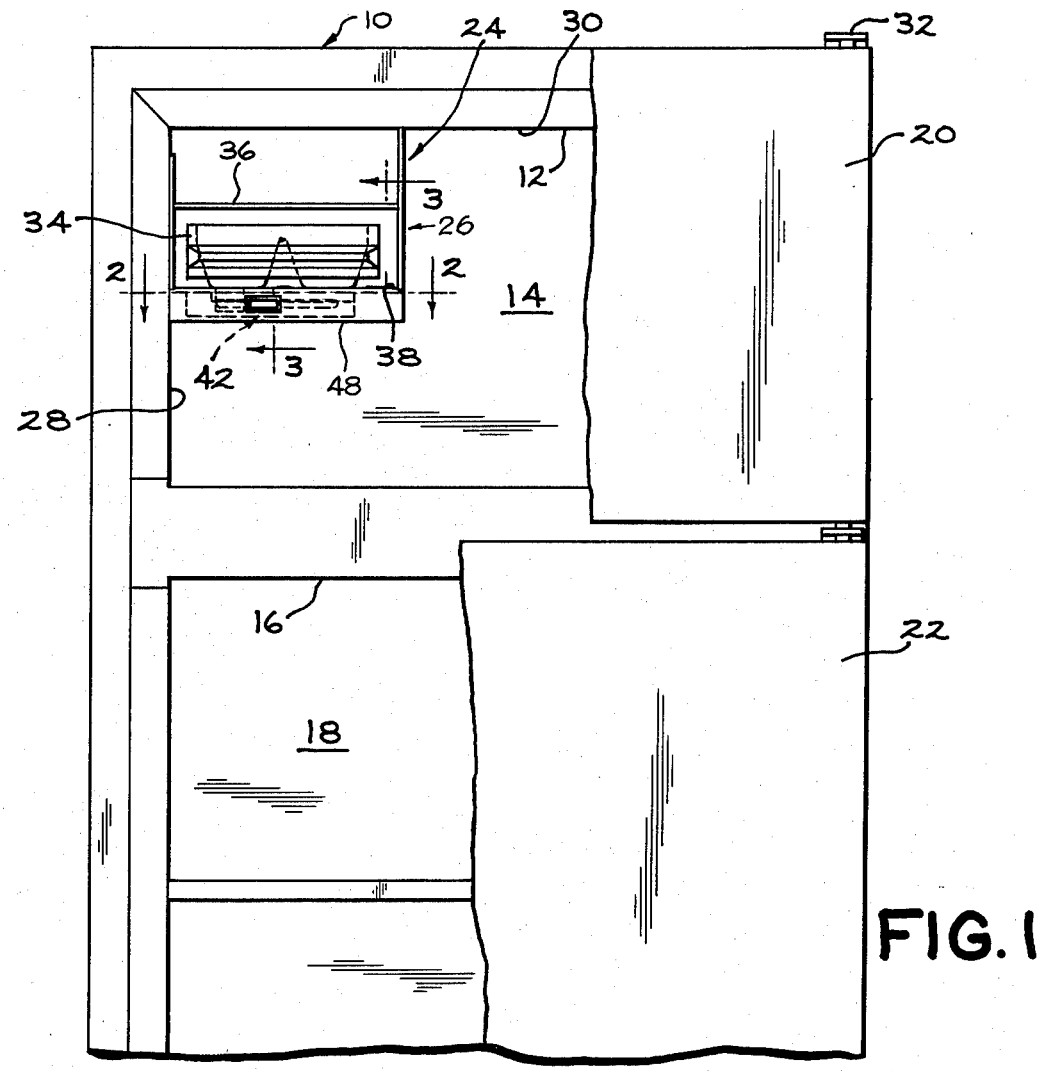
FIG. 1 is a front elevational view of a refrigerator having a freezer compartment on top and a fresh food compartment on the bottom and showing the visual device of the present invention in the freezer compartment.
Figure 2:
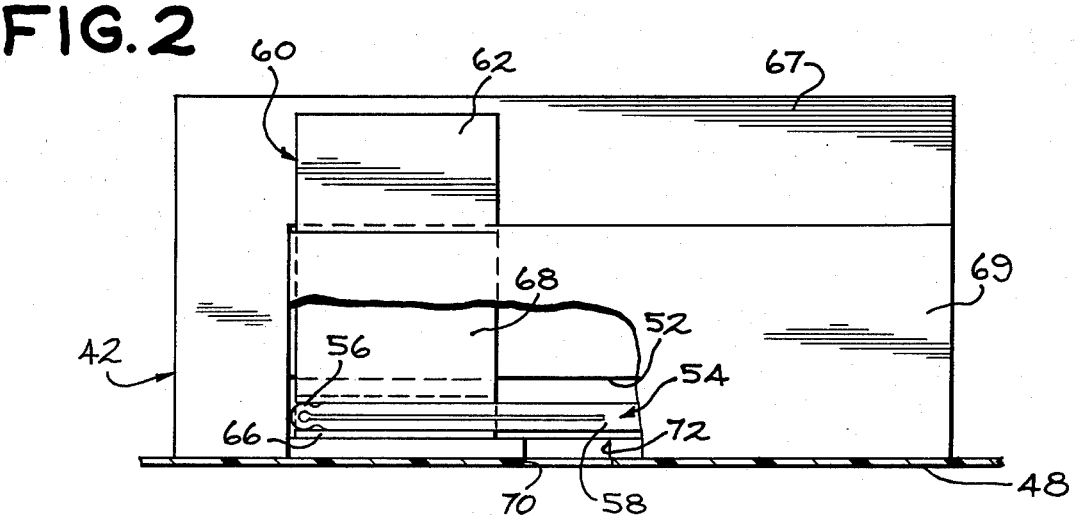
FIG. 2 is a top plan view of the visual device of the present invention taken along lines 2—2 of FIG. 1.

With reference to FIG. 1 of the drawings, there is illustrated a top mount refrigerator cabinet including an outer case 10, an upper inner liner 12 defining a freezer storage compartment 14 and a lower inner liner 16 defining a fresh food storage compartment 18. The access openings to the freezer and fresh food compartments are respectively closed by doors 20 and 22. While a top mount refrigerator is shown and described, it should be understood that my invention may be used with any type of refrigerator having a freezer storage compartment.

Located in the upper left hand rear corner of the freezer storage compartment 14 is an ice cube tray assembly 24 which includes a frame 26 secured to the interior of the freezer storage compartment 14 against inner liner side wall 28 and the inner liner top wall 30. The ice cube tray assembly 24 is usually located remote from the hinges 32 for the door 20 for easy access to the ice cube tray 34 upon opening of the door 20. The ice cube tray assembly 24 may include shelves such as upper shelf 36 and lower shelf 38 upon which the ice cube trays 34 may be placed. Only one ice cube tray 34 on shelf 38 is shown in FIG. 1.

It will be understood from the above description and FIG. 1 that the user of a top mount refrigerator would have difficulty in determining whether water in the ice cube tray 34 is frozen so that the ice cubes may be removed from the multiple cavities 40 in the ice cube tray. Usually, the ice cube trays 34 are made of flexible plastic and to remove the ice cubes from the cavities 40, the tray is inverted and twisted along its longitudinal axis whereupon the ice cubes are ejected from the cavities 40. The ice cube removal operation is commonly referred to as harvesting the ice cubes. The ice cube tray, after harvesting of the ice cubes and returned to its horizontal upright position, is then filled with water for subsequent freezing in the freezer compartment into ice cubes. The preferred embodiment description and the drawings show an ice cube tray 34 that is manually filled with water, removed from the freezer storage compartment 14, and manually twisted to release the ice pieces from the cavities 40. This invention, however, is also applicable to an ice cube tray that is automatically filled in the freezer storage compartment 14 by water from the household supply and then manually manipulated to remove the ice cubes when the water is frozen. Examples of this latter type of ice cube tray are disclosed in U.S. Pat. Nos. 3,163,025, 3,226,939, and 3,273,353, all assigned to the same assignee as the present invention.

The visual device 42 to indicate when water in the ice cube tray 34 is frozen includes a stationary thermal insulated base 44 which is generally rectangular in shape and made of any suitable insulating material such as styrofoam and the like. The stationary thermal insulated base 44 is secured to the frame 26 and is located on the bottom surface 46 of lower shelf 38 in close proximity to the ice cube tray 34. An opening 50 in the lower shelf 38 is immediately above a portion of the stationary thermal insulated base 44 and underneath one of the cavities 40 of the ice cube tray 34 when the tray is in its proper position within the frame 26. Preferably, the most forward cavity 40 of the ice cube tray 34 overlies the opening 50.

Figure 3:
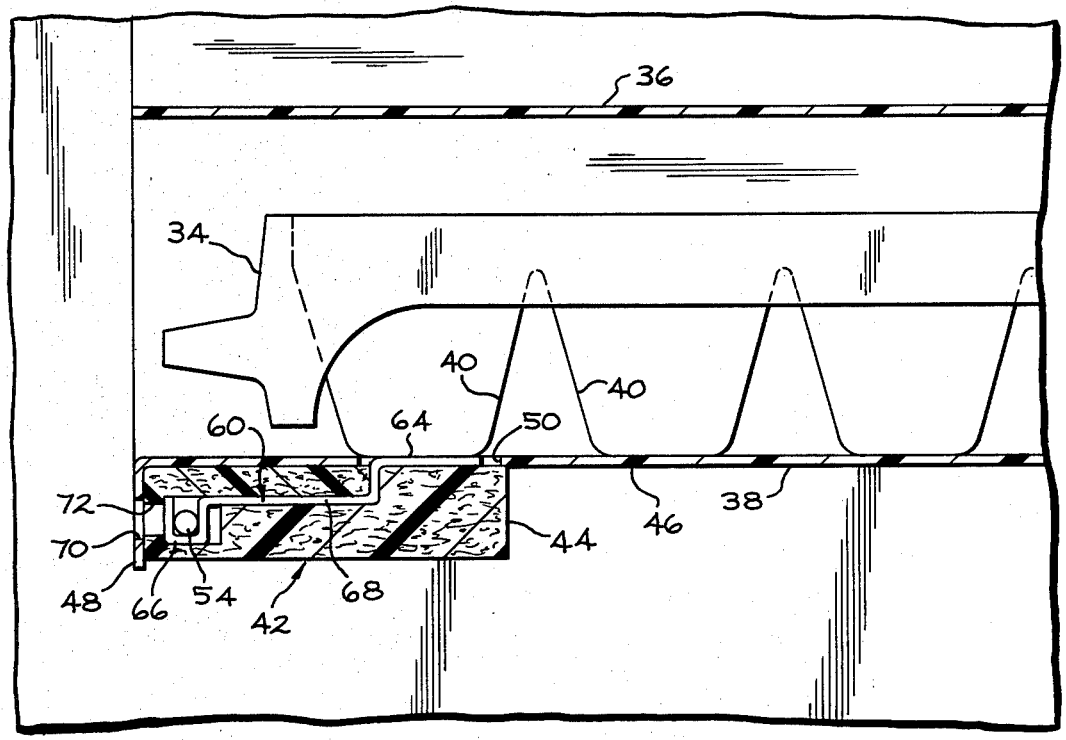
FIG. 3 is a cross-sectional view of the visual device of the present invention taken along lines 3—3 of FIG. 1.
Figure 4:
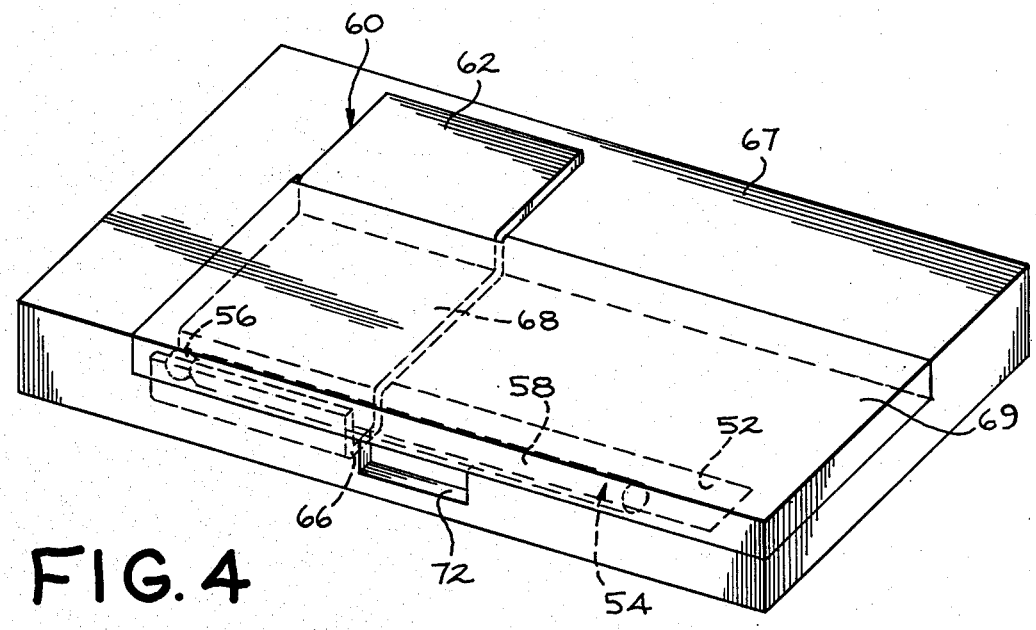
FIG. 4 is a prospective view of the visual device of the present invention.

The frame 26 has a downwardly directed flange 48 relative to the front of the lower shelf 38 against which the forward surface 51 of the stationary thermal insulated base 44 abuts. There is a channel 52 in the stationary thermal insulated base 44 that is spaced from and runs parallel with the flange 48. Within channel 52 is a thermometer 54 having a bulb 56 containing liquid and a connecting capillary tube 58 for a liquid column. There is a thermal conductive member 60 having one end 62 received in the opening 50 of shelf 38 and is interposed between the stationary thermal insulated base 44 and the bottom wall 64 of cavity 40 which overlies the opening 50. The thermal conductive member 60 and the stationary thermal insulated base 44 cooperate to support a portion of the ice cube tray 34. The thermal conductive member 60 has its opposite end 66 geometrically formed in the shape of a U as viewed in lateral cross-section (FIG. 3) and receives in thermal transfer contact the bulb 56 of the thermometer 54. Interconnecting the one end 62 and the opposite end 66 of the thermal conductive member 60 is a middle portion 68. The thermal conductive member 60 is made of any suitable material of high thermal conductivity, such as copper or aluminum, that will transfer or conduct heat characteristics from the one end 62 through the middle portion 68 to the opposite end 66 which is in thermal transfer relationship with the bulb 56 of thermometer 54. As indicated in the drawings, the stationary thermal insulating base 44 is made up of two sections for ease of assembly of the visual device. One section being 67 and the other section being 69. Section 67 is the main portion of the stationary thermal insulated base 44 while section 69 is merely utilized as a lid or cap to be able to assemble the parts in the stationary thermal insulated base easily and yet have them embeded in the insulating material.

Flange 48 depending relative to lower shelf 38 of the frame 26 is a shield over the thermometer 54 and has an opening 70 behind which is also an opening 72 in the stationary thermal insulated base 44. Both of the openings 70 and 72 are in registration or alignment with each other to provide visual access to a portion of the capillary tube 58 of thermometer 54. The aligned openings 70 and 72 are located with respect to the capillary tube 58 where the liquid column in the capillary tube would indicate the freezing temperature of water in the ice cube tray 34. It should be noted that in the normal freezing of water when the water is transformed from liquid to solid phase, the temperature of the water stays at about 32° F. until the water is completely frozen. Thereafter, the temperature of the ice is lowered very rapidly by the much lower freezer compartment temperature, usually about 0° F., thus compelling the thermometer liquid column to follow the fast drop in temperature. Thus, the visual indicator is quite accurate and is quickly responsive to the point at which the ice cubes are ready to be harvested. The openings 70 and 72 are arranged to have visual access at a point on the capillary tube 58 where the liquid column in the tube would indicate that the water in the ice cube tray 34 is at 32° F. and the opening could extend several degrees above that point for a good visual display.

It will be understood that there will be inherently some slight difference in the actual temperature of the water or ice in the ice cube tray 34 and the temperature transmitted to the bulb 56 of the thermometer 54 due to heat loss or temperature conductivity lag. This will depend upon such factors as the quality of the thermal insulated base 44, the thermal conductivity characteristics of the thermal conductive member 60, the distance the heat is conducted, etc. However, the position on the capillary tube 58 that corresponds to when the water in the ice cube tray 34 reaches the freezing point (32° F.) may be easily determined for any particular structural arrangement of my visual device.

In operation of the above described visual device arrangement, the water introduced into the cavities 40 of the ice cube tray 34 in the freezer storage compartment 14 is well above freezing. Heat of the water is transmitted through the bottom wall 64 of cavity 40 overlying opening 50 to the one end 62 of the thermal transfer member 60 and is conducted through the middle portion 68 to the opposite end 66 where it is in thermal transfer relationship with bulb 56 of thermometer 54. The thermometer 54 acts in a normal fashion and the liquid in the bulb rises because of the difference in coefficient of expansion between the liquid in the bulb 56 and the thermometer casing. As a result the liquid expands and rises or moves along the capillary tube in a direction away from the bulb 56. Because the heat of the incoming water is above freezing, the liquid in the capillary tube 54 will continue to move rapidly beyond the visual access openings 70 and 72 to an elevated temperature. Therefore, the user of the refrigerator when looking through the access openings 70 and 72 will see a liquid line in the capillary tube, normally red, and know immediately that the temperature of the water in the ice piece tray 34 is above freezing and that the ice cubes are not ready to be harvested. As the temperature of the water continues to drop under freezing atmospheric conditions within the freezer compartment 14, the liquid in the capillary tube moves toward the bulb 56 until the water reaches its freezing point. The liquid in the capillary tube will remain at a position indicating the freezing point of the water in the ice cube tray 34 until all of the water has been frozen then rapidly drop and pass through the visual access area provided by aligned openings 70 and 72. Thus, the user of the refrigerator may look through the aligned visual access openings 70 and 72 and note that the liquid column is not visible indicating that the water in the ice cube tray 34 is frozen and the ice cubes are ready for harvesting.

The foregoing is a description of the preferred embodiment of the invention and it should be understood that variations may be made thereto without departing from the true spirit of the invention as defined in the appended claims.

What is claimed is:

1. A visual device in the freezer compartment of a refrigerator to indicate when water in an ice cube tray is frozen comprising:

a stationary thermal insulated sectioned base in close proximity to a bottom portion of the ice cube tray;

a thermometer located remote from said portion of the ice cube tray and having a bulb containing liquid and a connecting capillary tube for a liquid column, said thermometer being embedded in the insulated base;

a thermal conductive member in heat transfer relationship between said portion of the ice piece tray and the thermometer bulb, said member having a portion geometrically formed to enclose a substantial portion of the thermometer bulb; and visual means provided in a selected portion in said base and relative to the liquid column in the capillary tube so as to provide access for indicating on the thermometer when water in the ice piece tray is frozen.

2. The visual device of claim 1 further including a shield member over the thermometer, said shield member and thermal insulated base each having an opening in registration with the capillary tube where the liquid column in the capillary tube would indicate the freezing temperature of the water.

3. The visual device of claim 2 wherein a vertical flange is the shield member over the thermometer.

4. The visual device of claim 1 wherein the thermal conductive member is a metal of a high thermal conductivity.

5. The visual device of claim 1 wherein the thermal conductive member is embedded in the thermal insulated base.

6. The visual device of claim 1 wherein the stationary thermal insulated base and thermal conductive member cooperate to support the portion of the ice cube tray in heat transfer relationship with the thermal conductive member.

7. The visual device of claim 1 wherein a shelf supports a portion of the ice piece tray and an opening in the shelf receives the thermal conductive member.

* * * * *